United States Patent
Kang

(10) Patent No.: US 8,725,709 B2
(45) Date of Patent: May 13, 2014

(54) ELECTRONIC DEVICE AND OPERATING METHOD THEREOF

(75) Inventor: Yeonseok Kang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/053,053

(22) Filed: Mar. 21, 2011

(65) Prior Publication Data
US 2012/0084308 A1    Apr. 5, 2012

(51) Int. Cl.
*G06F 17/30* (2006.01)

(52) U.S. Cl.
USPC .......................................... 707/705; 707/758

(58) Field of Classification Search
USPC .................................. 707/705, 758
See application file for complete search history.

(56) References Cited

U.S. PATENT DOCUMENTS

| | | | |
|---|---|---|---|
| 6,625,603 B1 * | 9/2003 | Garg et al. ..................... | 707/758 |
| 6,701,308 B1 * | 3/2004 | Chen et al. ..................... | 715/200 |
| 7,143,089 B2 * | 11/2006 | Petras et al. .................. | 707/749 |
| 7,222,131 B1 * | 5/2007 | Grewal et al. ................. | 717/168 |
| 7,373,365 B2 * | 5/2008 | Varadarajan et al. ......... | 382/306 |
| 7,725,474 B2 * | 5/2010 | Tamai et al. .................. | 707/758 |
| 7,783,743 B1 * | 8/2010 | Brown ........................... | 709/224 |
| 8,041,693 B2 * | 10/2011 | Miyata ........................... | 707/705 |
| 8,122,513 B2 * | 2/2012 | Mihira ............................ | 726/27 |
| 8,219,134 B2 * | 7/2012 | Maharajh et al. ............. | 455/519 |
| 2011/0252375 A1 * | 10/2011 | Chaudhri ....................... | 715/835 |

FOREIGN PATENT DOCUMENTS

WO    2009/032107    3/2009

OTHER PUBLICATIONS

Basson: "Context Search 0.4.4," Context Search Addon for Firefox, Jun. 2009, XP-002661787.

* cited by examiner

*Primary Examiner* — Kim Nguyen

(74) *Attorney, Agent, or Firm* — Lee, Hong, Degerman, Kang & Waimey

(57) ABSTRACT

An electronic device is provided. The electronic device may include a memory, a display unit, and a controller. The controller may generate a first folder having a name including text obtained from first contents displayed on the display unit, search the memory for second contents that are associated with the obtained text, and store information related to the searched second contents in the first folder. Thus a user of the electronic device may integrally store, manage, and utilize the second contents associated with the text.

16 Claims, 22 Drawing Sheets

SMART PHONE   TABLET PC   TABLET PC   LAPTOP COMPUTER

100

(a)  (b)

ELECTRONIC DEVICE AND OPERATING METHOD THEREOF

Pursuant to 35 U.S.C. §119(a), this application claims the benefit of earlier filing date and right of priority to Korean Patent Application No. 10-2010-0096698 filed on Oct. 5, 2010, the contents of which are hereby incorporated by reference herein in their entirety.

BACKGROUND

1. Field

The present disclosure is directed to an electronic device that may effectively manage and utilize contents associated with each other among various contents stored in a memory of the electronic device.

2. Related Art

As types and functions of electronic devices are diversified, various applications for the electronic devices are developed correspondingly. The various applications generate a number of various contents. However, such contents may be only separately accessed through various menus.

SUMMARY

Exemplary embodiments of the present invention provide an electronic device allowing a user to integrally store, manage, and utilize contents associated with specific text among various contents stored in a memory.

According to an embodiment of the present invention, an electronic device may include a memory, a display unit, and a controller. The controller may generate a folder having text obtained from first contents displayed on the display unit as a name, search second contents associated with the obtained text in the memory, and store information on the searched second contents in the generated folder.

According to an embodiment of the present invention, an electronic device may include a memory, a display unit, and a controller. The controller may generate and display a folder on the display unit, search contents associated with the folder in the memory using text associated with the folder, and store information on the searched contents in the folder.

BRIEF DESCRIPTION OF THE DRAWINGS

The accompany drawings, which are included to provide a further understanding of this document and are incorporated on and constitute a part of this specification illustrate embodiments of this document and together with the description serve to explain the principles of this document.

DETAILED DESCRIPTION

The present invention will now be described more fully with reference to the accompanying drawings, in which exemplary embodiments of the invention are shown. The invention may, however, be embodied in many different forms and should not be construed as being limited to the embodiments set forth herein; rather, there embodiments are provided so that this disclosure will be thorough and complete, and will fully convey the concept of the invention to those skilled in the art.

Hereinafter, a mobile terminal relating to the present invention will be described below in more detail with reference to the accompanying drawings. In the following description, suffixes "module" and "unit" are given to components of the mobile terminal in consideration of only facilitation of description and do not have meanings or functions discriminated from each other.

The mobile terminal described in the specification can include a cellular phone, a smart phone, a laptop computer, a digital broadcasting terminal, personal digital assistants (PDA), a portable multimedia player (PMP), a navigation system and so on.

Figure 1:
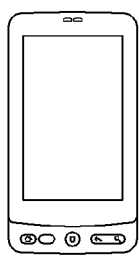
FIG. 1 illustrates various types of electronic devices according to an embodiment of the present invention.
Figure 1:
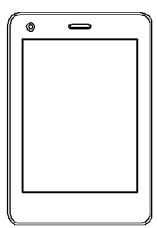
Figure 1:
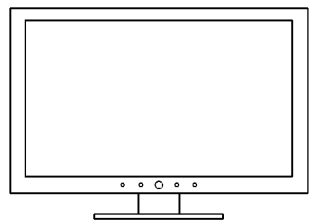
Figure 1:
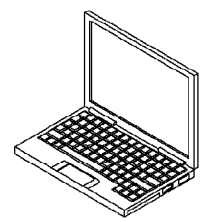

FIG. 1 illustrates various types of electronic devices 100 according to an embodiment of the present invention. The electronic devices 100 may integrally store, manage, and utilize second contents associated with text obtained from first contents displayed on a display unit. The text may be directly selected from the first contents by a user or extracted according to a predetermined method.

Referring to FIG. 1, the electronic devices 100 may include a smart phone, a tablet PC, a smart TV, and a laptop computer. Although not shown in FIG. 1, the electronic devices 100 may further include, but not limited to, a mobile terminal, such as a mobile phone, a PDA (Personal Digital Assistants), a PMP (Portable Multimedia Player), an e-book, or a navigation system, and a desktop computer.

Hereinafter, a mobile terminal will be described as an example of the electronic device in terms of characteristics and a driving method thereof.

Figure 2:
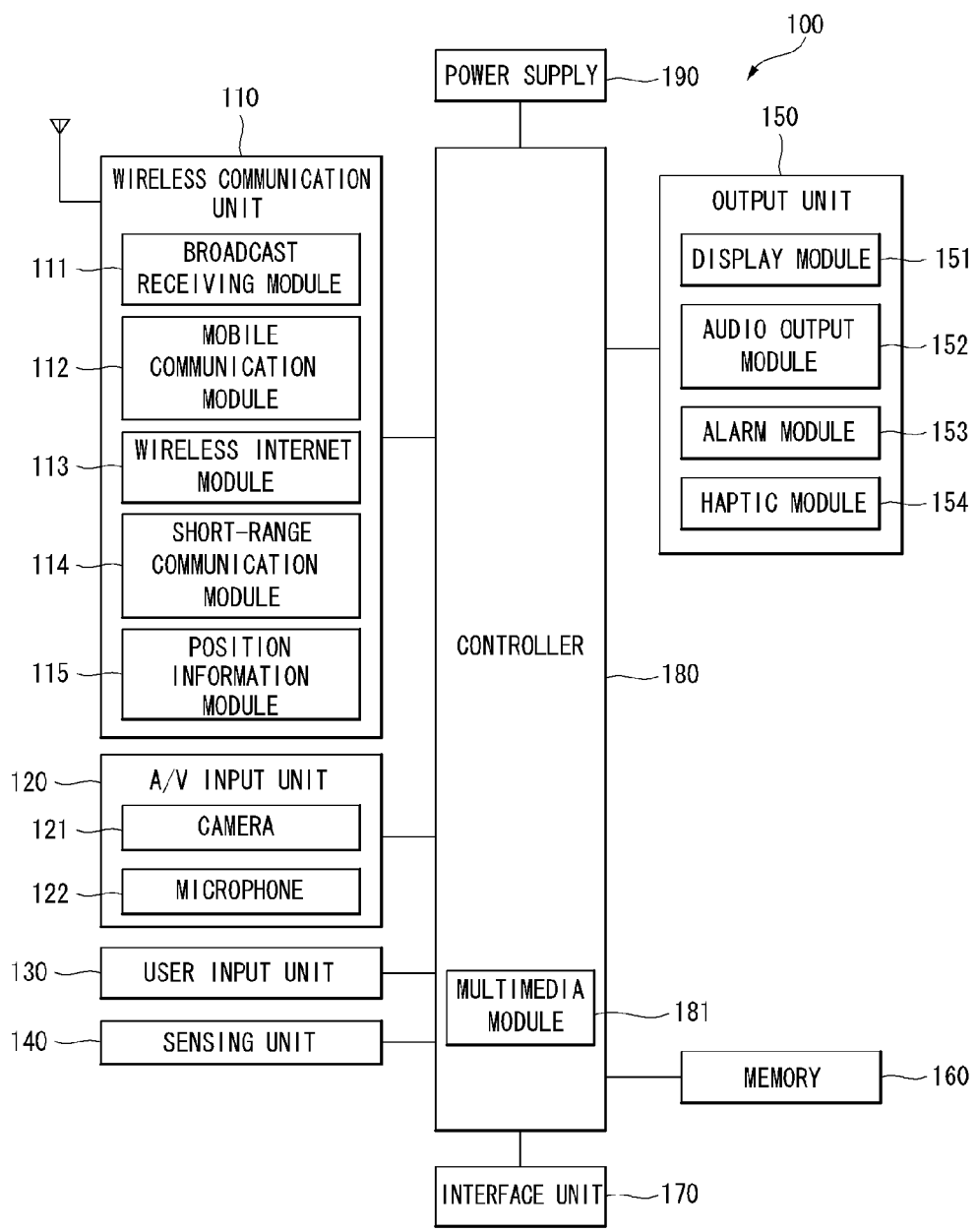
FIG. 2 is a block diagram illustrating a mobile terminal that is an example of an electronic device according to an embodiment of the present invention.

FIG. 2 is a block diagram illustrating a mobile terminal 100 that is an example of an electronic device according to an embodiment of the present invention. The mobile terminal 100 can include a wireless communication unit 110, an audio/video (A/V) input unit 120, a user input unit 130, a sensing unit 140, an output unit 150, a memory 160, an interface unit 170, a controller 180, and a power supply 190. The components shown in FIG. 2 are not essential parts and the number of components included in the mobile terminal 100 can be varied.

The components of the mobile terminal will now be described.

The wireless communication unit 110 can include at least one module that enables wireless communication between the mobile terminal 100 and a radio communication system or between the mobile terminal 100 and a network in which the mobile terminal 100 is located. For example, the wireless communication unit 110 can include a broadcasting receiving module 111, a mobile communication module 112, a wireless Internet module 113, a short-range communication module 114 and a position information module 115.

The broadcasting receiving module 111 receives broadcasting signals and/or broadcasting related information from an external broadcasting management server through a broadcasting channel.

The broadcasting channel can include a satellite channel and a terrestrial channel. The broadcasting management server can be a server that generates and transmits broadcasting signals and/or broadcasting related information or a server that receives previously created broadcasting signals and/or broadcasting related information and transmits the broadcasting signals and/or broadcasting related information to a terminal. The broadcasting signals can include not only TV broadcasting signals, radio broadcasting signals and data broadcasting signals but also signals in the form of combination of a TV broadcasting signal and a radio broadcasting signal.

The broadcasting related information can be information on a broadcasting channel, a broadcasting program or a broadcasting service provider. The broadcasting related information can be provided even through a mobile communication network. In this case, the broadcasting related information can be received by the mobile communication module 112.

The broadcasting related information can exist in various forms. For example, the broadcasting related information can exist in the form of electronic program guide (EPG) of digital multimedia broadcasting (DMB) or in the form of electronic service guide (ESG) of digital video broadcast-handheld (DVB-H).

The broadcasting receiving module 111 receives broadcasting signals using various broadcasting systems. Particularly, the broadcasting receiving module 111 can receive digital broadcasting signals using digital broadcasting systems such as digital multimedia broadcasting-terrestrial (DMB-T), digital multimedia broadcasting-satellite (DMB-S), media forward link only (MediaFLO), DVB-H and integrated services digital broadcast-terrestrial (ISDB-T) systems. The broadcasting receiving module 111 can be constructed to be suited to broadcasting systems providing broadcasting signals other than the above-described digital broadcasting systems.

The broadcasting signals and/or broadcasting related information received through the broadcasting receiving module 111 can be stored in the memory 160. The mobile communication module 112 transmits/receives a radio signal to/from at least one of a base station, an external terminal and a server on a mobile communication network. The radio signal can include a voice call signal, a video telephony call signal or data in various forms according to transmission and receiving of text/multimedia messages.

The wireless Internet module 113 means a module for wireless Internet access and can be included in the mobile terminal 100 or externally attached to the mobile terminal 100. Wireless local area network (WLAN), wireless broadband (Wibro), world interoperability for microwave access (Wimax), high speed downlink packet access (HSDPA) and so on can be used as a wireless Internet technique.

The short-range communication module 114 means a module for local area communication. Bluetooth, radio frequency identification (RFID), infrared data association (IrDA), ultra wideband (UWB) and ZigBee can be used as a local area communication technique.

The position information module 115 confirms or obtains the position of the mobile terminal. A global positioning system (GPS) module is a representative example of the position information module 115. According to the current technology, the GPS module 115 can calculate information on distances between one point (object) and at least three satellites and information on the time when the distance information is measured and apply trigonometry to the obtained distance information to obtain three-dimensional position information on the point (object) according to latitude, longitude and altitude at a predetermined time.

Furthermore, a method of calculating position and time information using three satellites and correcting the calculated position and time information using another satellite is also used. In addition, the GPS module 115 continuously calculates the current position in real time and calculates velocity information using the position information.

Referring to FIG. 2, the A/V input unit 120 is used to input an audio signal or a video signal and can include a camera 121 and a microphone 122. The camera 121 processes image frames of still images or moving images obtained by an image sensor in a video telephony mode or a photographing mode. The processed image frames can be displayed on a display module 151.

The image frames processed by the camera 121 can be stored in the memory 160 or transmitted to an external device through the wireless communication unit 110. The mobile terminal 100 can include at least two cameras 121 according to constitution of the terminal.

The microphone 122 receives an external audio signal in a call mode, a recording mode or a speed recognition mode and processes the received audio signal into electric audio data. The audio data can be converted into a form that can be transmitted to a mobile communication base station through the mobile communication module 112 and output in the call mode. The microphone 122 can employ various noise removal algorithms for removing noise generated when the external audio signal is received.

The user input unit 130 receives input data for controlling the operation of the terminal from a user. The user input unit 130 can include a keypad, a dome switch, a touch pad (constant voltage/capacitance), jog wheel, jog switch and so on.

The sensing unit 140 senses the current state of the mobile terminal 100, such as open/close state of the mobile terminal 100, the position of the mobile terminal 100, whether a user touches the mobile terminal 100, the direction of the mobile terminal 100 and acceleration/deceleration of the mobile terminal 100 and generates a sensing signal for controlling the operation of the mobile terminal 100. For example, the sensing unit 140 can sense whether a slide phone is opened or closed when the mobile terminal 100 is the slide phone. Furthermore, the sensing unit 140 can sense whether the power supply 190 supplies power and whether the interface 170 is connected to an external device. The sensing unit 140 can include a proximity sensor.

The output unit 150 generates visual, auditory or tactile output and can include the display module 151, an audio output module 152, an alarm module 153 and a haptic module 154. The display module 151, the audio output module 152, the alarm module 153 and the haptic module 154 may be divided from the output unit 150 and may be implemented a independent functional unit, respectively.

The display module 151 displays information processed by the mobile terminal 100. For example, the display module 151 displays UI or graphic user interface (GUI) related to a telephone call when the mobile terminal is in the call mode. The display module 151 displays a captured or/and received image, UI or GUI when the mobile terminal 100 is in the video telephony mode or the photographing mode. The display module 151 may be implemented by a independent display unit 151 unlike illustrated in FIG. 2.

The display module 151 can include at least one of a liquid crystal display, a thin film transistor liquid crystal display, an organic light-emitting diode display, a flexible display and a three-dimensional display.

Some of these displays can be of a transparent type or a light transmission type. This can be referred to as a transparent display. The transparent display includes a transparent liquid crystal display. The rear structure of the display module 151 can also be of the light transmission type. According to this structure, a user can see an object located behind the body of the mobile terminal 100 through an area of the body of the mobile terminal 100, which is occupied by the display module 151.

The mobile terminal 100 can include at least two display modules 151 according to constitution of the terminal. For example, the mobile terminal 100 can include a plurality of displays that are arranged on a single face at a predetermined distance or integrated. Otherwise, the plurality of displays can be arranged on different sides.

In the case where the display module 151 and a sensor sensing touch (referred to as a touch sensor hereinafter) form a layered structure, which is referred to as a touch screen hereinafter, the display module 151 can be used as an input device in addition to an output device. The touch sensor can be in the form of a touch film, a touch sheet and a touch pad, for example.

The touch sensor can be constructed such that it converts a variation in pressure applied to a specific portion of the display module 151 or a variation in capacitance generated at a specific portion of the display module 151 into an electric input signal. The touch sensor can be constructed such that it can sense pressure of touch as well as the position and area of touch.

When touch input is applied to the touch sensor, a signal corresponding to the touch input is transmitted to a touch controller. The touch controller processes the signal and transmits data corresponding to the processed signal to the controller 180. Accordingly, the controller 180 can detect a touched portion of the display 151.

Referring to FIG. 2, the proximity sensor can be located in an internal region of the mobile terminal, surrounded by the touch screen, or near the touch screen. The proximity sensor senses an object accessing a predetermined sensing face or an object located near the proximity sensor using electromagnetic force or infrared rays without having mechanical contact. The proximity sensor has lifetime longer than that of a contact sensor and has wide application.

The proximity sensor includes a transmission type photoelectric sensor, a direct reflection type photo-electric sensor, a mirror reflection type photo-electric sensor, a high-frequency oscillating proximity sensor, a capacitive proximity sensor, a magnetic proximity sensor, an infrared proximity sensor, etc.

A capacitive touch screen is constructed such that proximity of a pointer is detected through a variation in an electric field according to the proximity of the pointer. In this case, the touch screen (touch sensor) can be classified as a proximity sensor.

For convenience of explanation, an action of accessing the pointer to the touch screen while the pointer it not being in contact with the touch screen such that location of the pointer on the touch screen is recognized is referred to as "proximity touch" and an action of bring the pointer into contact with the touch screen is referred to as "contact touch" in the following description. A proximity touch point of the pointer on the touch screen means a point of the touch screen to which the pointer corresponds perpendicularly to the touch screen when the pointer proximity-touches the touch screen.

The proximity sensor senses proximity touch and a proximity touch pattern (for example, a proximity touch distance, a proximity touch direction, a proximity touch velocity, a proximity touch time, a proximity touch position, a proximity touch moving state, etc.). Information corresponding to the sensed proximity touch action and proximity touch pattern can be displayed on the touch screen.

The audio output module 152 can output audio data received from the wireless communication unit 110 or stored in the memory 160 in a call signal receiving mode, a telephone call mode or a recording mode, a speech recognition mode and a broadcasting receiving mode. The audio output module 152 outputs audio signals related to functions (for example, a call signal incoming tone, a message incoming tone, etc.) performed in the mobile terminal 100. The audio output module 152 can include a receiver, a speaker, a buzzer, etc.

The alarm module 153 outputs a signal for indicating generation of an event of the mobile terminal 100. Examples of events generated in the mobile terminal include receiving of a call signal, receiving of a message, input of a key signal, input of touch, etc. The alarm module 153 can output signals in forms different from video signals or audio signals, for example, a signal for indicating generation of an event through vibration. The video signals or the audio signals can be also output through the display module 151 or the audio output module 152.

The haptic module 154 generates various haptic effects that the user can feel. A representative example of the haptic effects is vibration. The intensity and pattern of vibration generated by the haptic module 154 can be controlled. For example, different vibrations can be combined and output or sequentially output.

The haptic module 154 can generate a variety of haptic effects including an effect of stimulus according to arrangement of pins vertically moving for a contact skin face, an effect of stimulus according to jet force or sucking force of air through a jet hole or a sucking hole, an effect of stimulus rubbing the skin, an effect of stimulus according to contact of an electrode, an effect of stimulus using electrostatic force and an effect according to reproduction of cold and warmth using an element capable of absorbing or radiating heat in addition to vibrations.

The haptic module 154 can not only transmit haptic effects through direct contact but also allow the user to feel haptic effects through kinesthetic sense of his fingers or arms. The mobile terminal 100 can include at least two haptic modules 154 according to constitution of the mobile terminal.

The memory 160 can store a program for the operation of the controller 180 and temporarily store input/output data (for example, phone book, messages, still images, moving images, etc.). The memory 160 can store data about vibrations and sounds in various patterns, which are output from when a touch input is applied to the touch screen.

The memory 160 can include at least one of a flash memory, a hard disk type memory, a multimedia card micro type memory, a card type memory (for example, SD or XD memory), a random access memory (RAM), a static RAM (SRAM), a read-only memory (ROM), an electrically erasable programmable ROM (EEPROM), a programmable ROM (PROM) magnetic memory, a magnetic disk and an optical disk. The mobile terminal 100 can operate in relation to a web storage performing the storing function of the memory 160 on the Internet.

The interface 170 serves as a path to all external devices connected to the mobile terminal 100. The interface unit 170 receives data from the external devices or power and transmits the data or power to the internal components of the mobile terminal 100 or transmits data of the mobile terminal 100 to the external devices.

The interface unit 170 can include a wired/wireless headset port, an external charger port, a wired/wireless data port, a memory card port, a port for connecting a device having a user identification module, an audio I/O port, a video I/O port, an earphone port, etc., for example.

An user identification module is a chip that stores information for authenticating the authority to use the mobile terminal 100 and can include a user identify module (UIM), a subscriber identify module (SIM) and a universal subscriber identify module (USIM). A device (referred to as an identification device hereinafter) including the user identification module can be manufactured in the form of a smart card. Accordingly, the identification device can be connected to the mobile terminal 100 through a card slot included in the interface unit 170.

The interface unit 170 can serve as a path through which power from an external cradle is provided to the mobile terminal 100 when the mobile terminal 100 is connected to the external cradle or a path through which various command signals inputted by the user through the cradle to the mobile terminal 100. The various command signals or power input from the cradle can be used as a signal for confirming whether the mobile terminal 100 is correctly set in the cradle.

The controller 180 controls the overall operation of the mobile terminal. For example, the controller 180 performs control and processing for voice communication, data communication and video telephony. The controller 180 can include a multimedia module 181 for playing multimedia. The multimedia module 181 can be included in the controller 180 or separated from the controller 180.

The controller 180 can perform a pattern recognition process capable of recognizing handwriting input or picture-drawing input applied to the touch screen as characters or images.

The power supply 190 receives external power and internal power and provides power required for the operations of the components of the mobile terminal under the control of the controller 180.

Various embodiments of the inventive concept can be implemented in a computer or similar device readable recording medium using software, hardware or a combination thereof, for example.

According to hardware implementation, the embodiments of the inventive concept can be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electrical units for executing functions. In some cases, the embodiments can be implemented by the controller 180.

According to software implementation, embodiments such as procedures or functions can be implemented with a separate software module executing at least one function or operation. Software codes can be implemented according to a software application written in an appropriate software language. Furthermore, the software codes can be stored in the memory 160 and executed by the controller 180.

The general operation and functions of the mobile terminal 100 have been described with reference to FIGS. 1 and 2. Hereinafter, an electronic device and a method of driving the electronic device will be described with reference to FIGS. 3 to 22, wherein the electronic device may generate a folder having as its name text obtained from first contents displayed on the display unit 151, may search second contents associated with the text in the memory 160, and may store information on the searched second contents in the generated folder.

Figure 3:
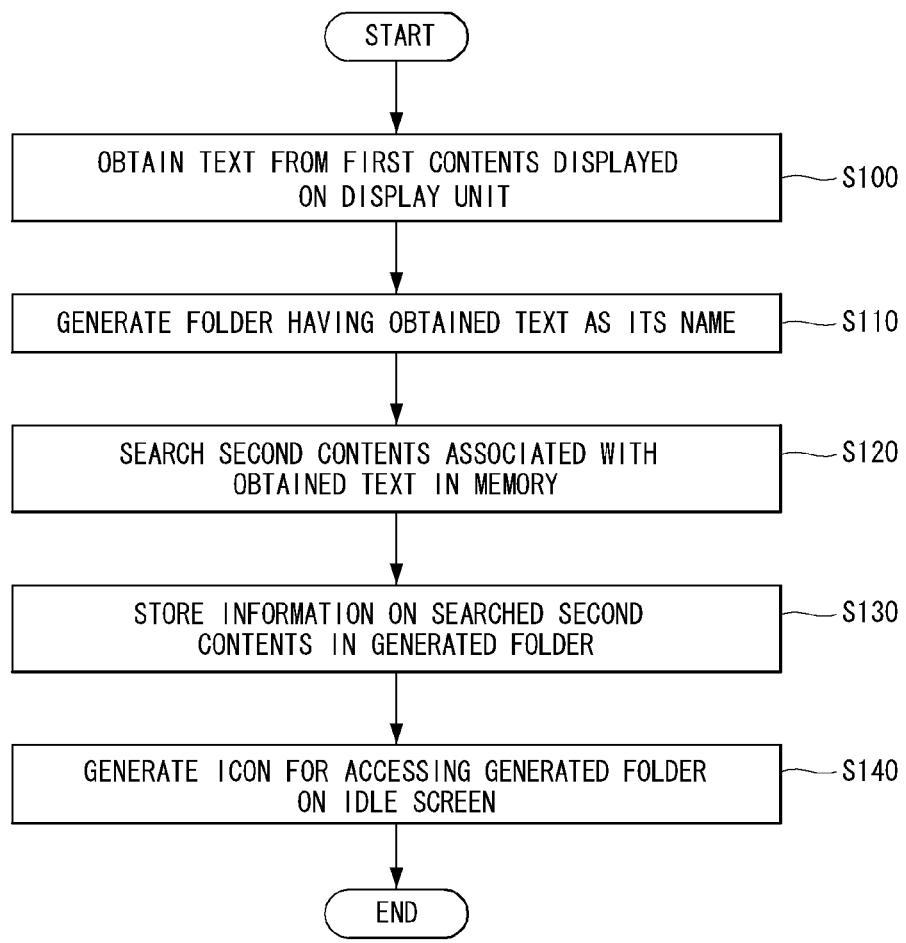
FIG. 3 is a flowchart illustrating a method of driving an electronic device according to an embodiment of the present invention.

FIG. 3 is a flowchart illustrating a method of driving an electronic device according to an embodiment of the present invention.

The method of driving the electronic device will now be described with reference to FIGS. 2 and 3.

First contents are displayed on the display unit 151 based on the operation of the mobile terminal 100. The first contents may include, but not limited to, text documents, web pages, phone books, moving pictures, still images, sound files, various contents generated as an execution result of an application, and folders and icons displayed on an idle screen.

When the first contents are displayed on the display unit 151, the controller 180 obtains text from the first contents (S100), for example, by a user's operation, such as a touch on a touch screen, or based on a predetermined method, such as a predetermined character recognition function.

Based on the obtained text, the controller 180 generates a folder having the obtained text as its name (S110) and searches second contents associated with the obtained text in the memory 160 (S120). The second contents associated with the obtained text may include the obtained text in at least one of names, abstract information, dates, formats, and storing locations of contents plus the text.

An example of the controller 180 searching contents including the obtained text as the content format will now be described. When text representing a content format is obtained from the first contents displayed on the display unit 151, the controller 180 may search the second contents corresponding to the obtained content format in the memory 160. For example, when the obtained text includes "ppt", the controller 180 may search documents having a "ppt" format in the memory 160. For example, when the obtained text includes "JPEG", the controller 180 may search image files having a "JPEG" format in the memory 160.

Upon completion of the content search in the memory 160, the controller 180 stores information on the searched second contents in the generated folder (S130). The information on the searched second contents may include, but not limited to, images, names, abstract information, dates, formats, storing locations, and sizes of the second contents.

When the information on the searched second contents are completely stored, the controller 180 generates an icon for accessing the generated folder on the idle screen of the mobile terminal 100 (S140). A user may easily access and use the second contents associated with the text through the icon.

An example of searching the second contents associated with the text in step S120 will now be described in greater detail.

In the case of searching messages stored in the memory 160, the controller 180 may select as second contents associated with the text a message including the obtained text and any one of a sender or recipient of the message, a sending or receiving date of the message, or a content of the message. The message may include an SMS (Short Message Service) message, an MMS (Multimedia Message Service) message, an email, etc.

In the case of searching phone books stored in the memory 160, the controller 180 may select a second content associated with the text information on a person stored in a phone book. Herein, the information on the preson includes the obtained text in at least one storing field of the phone book. The storing field in the phone book may include a name, a phone number, an address, an email address, a memo of a specific person.

In the case of searching web pages, the controller 180 may select as a second content associated with the obtained text a web page including the obtained text in the content. The content of the web page may include an address of the web page.

In the case of searching memos or schedules, the controller 180 may select as a second content associated with the text a memo or schedule including the text in at least one of a title, a content, a generation date, and a name of a writer of the memo or schedule.

In the case of searching applications or folders, the controller 180 may select as second contents an application or folder including the text in its name. In the case of searching pictures or sound files, the controller 180 may select as a second content a picture or sound file including the text in its name.

The method of searching the second contents associated with the obtained text is merely an example, and the present invention is not limited thereto.

Figure 4:
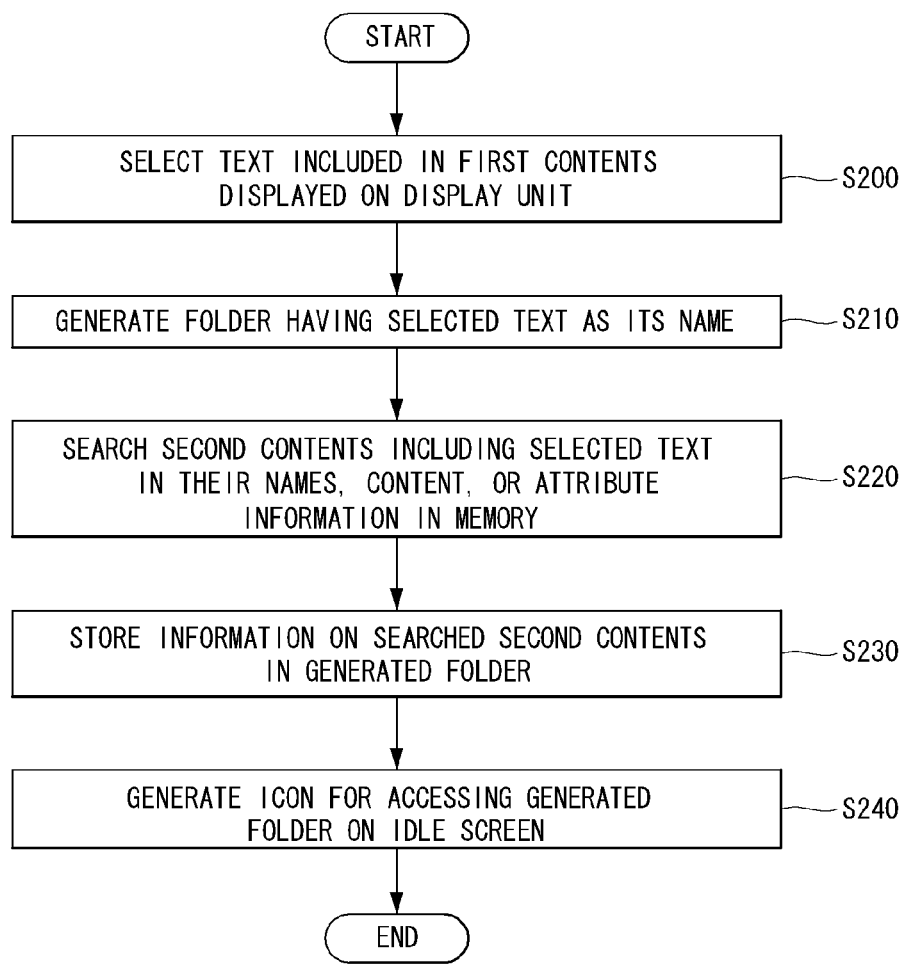
FIG. 4 is a flowchart illustrating a method of driving an electronic device according to an embodiment of the present invention.

FIG. 4 is a flowchart illustrating a method of driving an electronic device according to an embodiment of the present invention.

Figure 5:
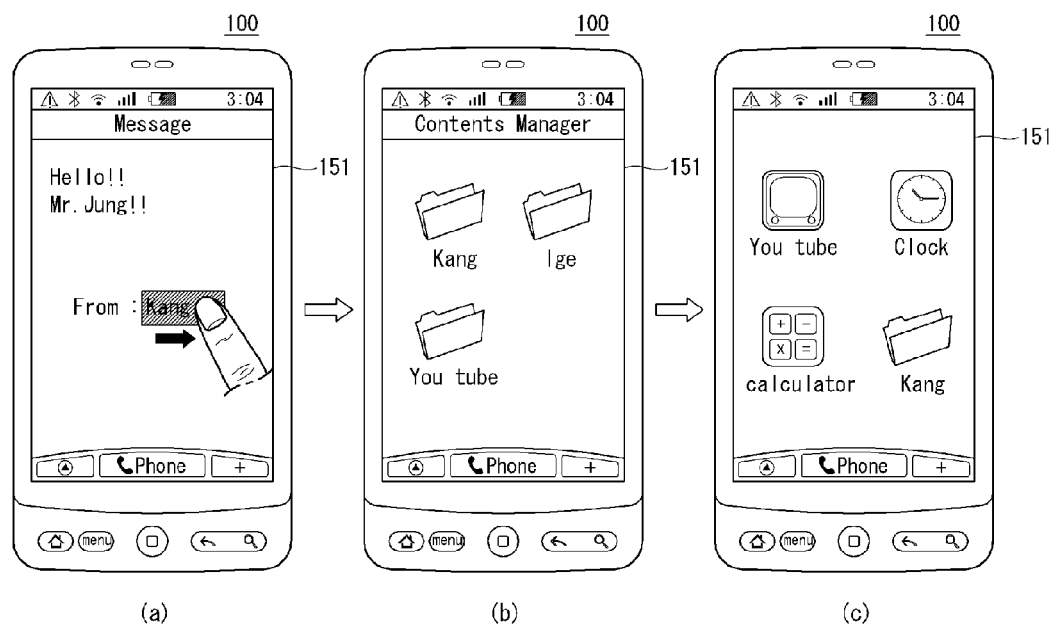
FIG. 5 illustrates that different images are displayed on a display unit according to the steps in the method of driving an electronic device as illustrated in FIG. 4.
Figure 6:
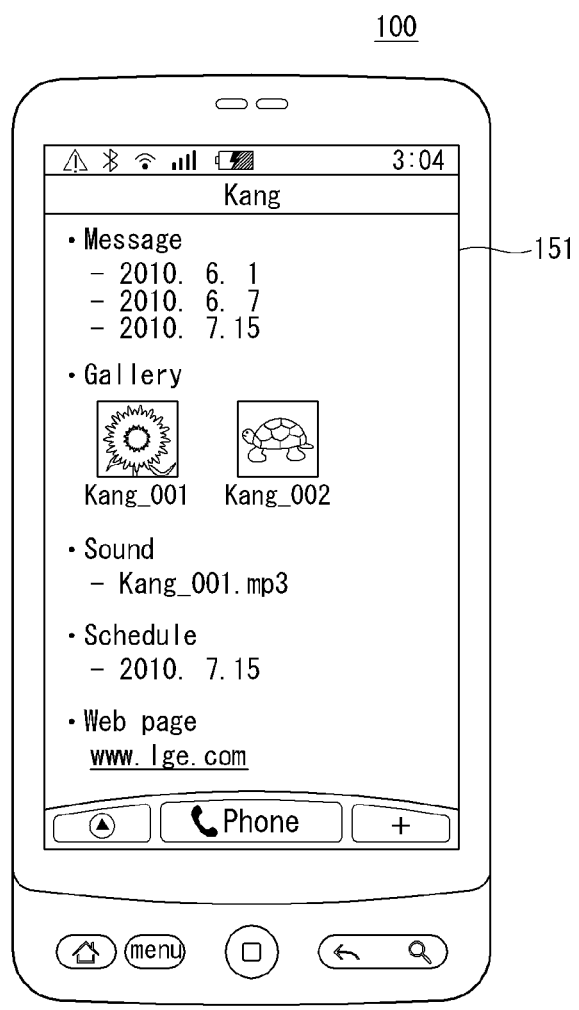
FIG. 6 illustrates contents included in a folder generated as an execution result of the driving method of an electronic device shown in FIG. 4

FIG. 5 illustrates that different images are displayed on the display unit 151 according to the steps in the method of driving an electronic device as illustrated in FIG. 4. FIG. 6 illustrates contents included in a folder generated as an execution result of the driving method of an electronic device shown in FIG. 4. The method of driving an electronic device will now be described with reference to FIGS. 2 and 6.

When first contents including text are displayed on the display unit 151, the controller 180 selects the text based on a user's operation (S200). Referring to (a) of FIG. 5, the controller 180 may select a message sender "Kang" from a message displayed on the display unit 151 based on a user's touch-and-drag operation. The user's operation for selecting the text from the first contents displayed on the display unit 151 may include text selection using an input tool, such as a mouse or a pen for input as well as the touch operation.

When the text is selected from the first contents, the controller 180 generates a folder having the selected text as its name (S210). For this purpose, a contents manager may be activated to generate a folder whose name is the same as the selected text as soon as the text is selected by a user. According to a setup of the contents manager, user's additional manipulation may be required after the text is selected from the first contents.

Referring to (b) of FIG. 5, the controller 180 generates a folder having the selected text "Kang" as its name in a subfolder of the contents manager.

After the generation of the folder having the selected text as its name, the controller 180 searches the memory 160 and extracts second contents including the selected text in at least one of names, content, or attribute information thereof (S220). And, the controller 180 stores information on the searched second contents in the generated folder (S230).

Referring to FIG. 6, received messages whose sender is "Kang" and which are stored in a subfolder of a message-related application, image files whose file name includes "Kang" and which are stored in a subfolder of an image-related application, MP3 files whose file name includes "Kang" and which are stored in a subfolder of a music play-related application, schedules whose content includes "Kang" and which are stored in a subfolder of a schedule-related application, and web pages whose content includes "Kang" and which are stored in the memory 160 may be stored in the folder having the text "Kang" as its name.

When the second contents are stored in the generated folder, the controller 180 generates an icon for accessing the folder on the idle screen (S240). Referring to (c) of FIG. 5, the controller 180 generates an icon whose name is equal to the selected text "Kang" on the idle screen.

According to the driving method of an electronic device shown in FIG. 4, the controller 180 generates the folder having the selected text "Kang" as its name in the subfolder of the contents manager and generates the icon for accessing the generated folder. According to an embodiment, the controller 180 may directly generate a folder whose name is "Kang" on the idle screen.

According to an embodiment, the controller 180 may select contents including text having the same category as that of the selected text in their names or content as the second contents.

For example, the controller 180 may recognize that an upper case letter and its corresponding lower case letter are equal to each other. Referring to FIG. 4, the controller 180 may recognize "kang" or "KANG" included in names or content of other contents as the selected text "Kang".

According to an embodiment, the controller 180 may recognize that the selected text written in a first language is identical to text written in a second language corresponding to the first language. Referring to FIG. 4, when the English text "Kang" is selected, the controller 180 may recognize Korean text "강" or Chinese text "姜" corresponding to the English text "Kang" as being equal to the selected text "Kang".

A few examples of the same category have been described, but the present invention is not limited thereto.

Figure 7:
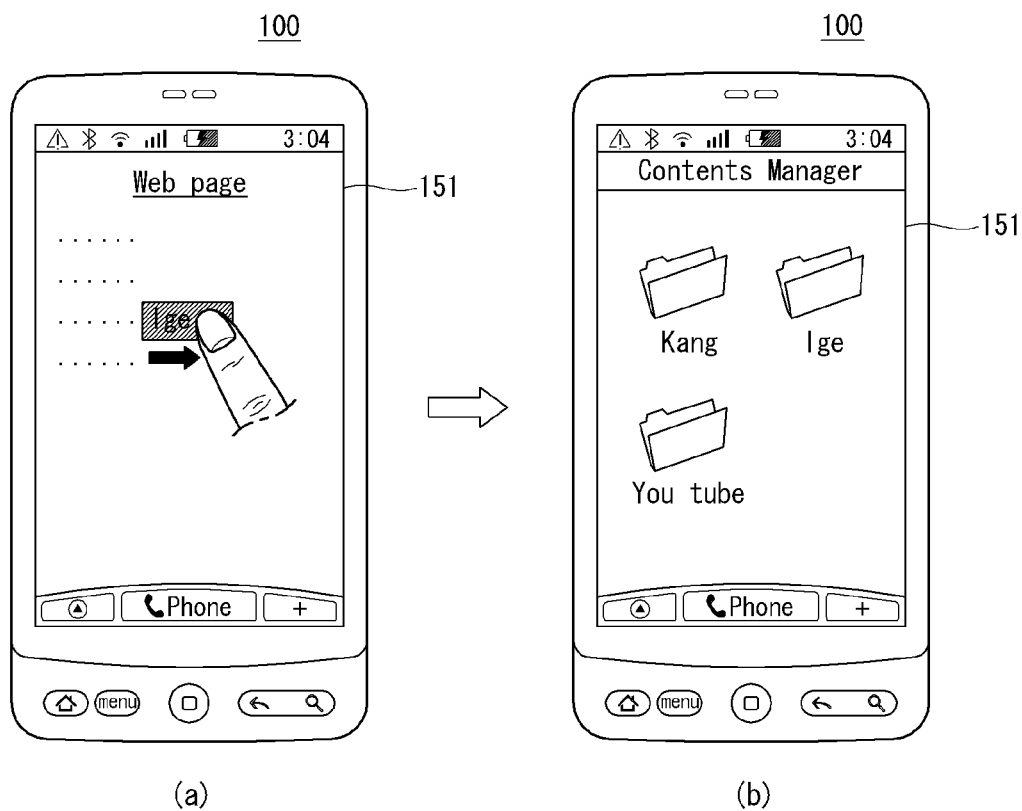
FIG. 7 illustrates a process of generating a folder having as its name text selected from content of a web page.

FIG. 7 illustrates a process of generating a folder having as its name text selected from content of a web page. Referring to FIG. 7, when text "lge" is selected from the content of the web page by a user's touch operation, the controller 180 generates a subfolder "lge" of the contents manager.

Figure 8:
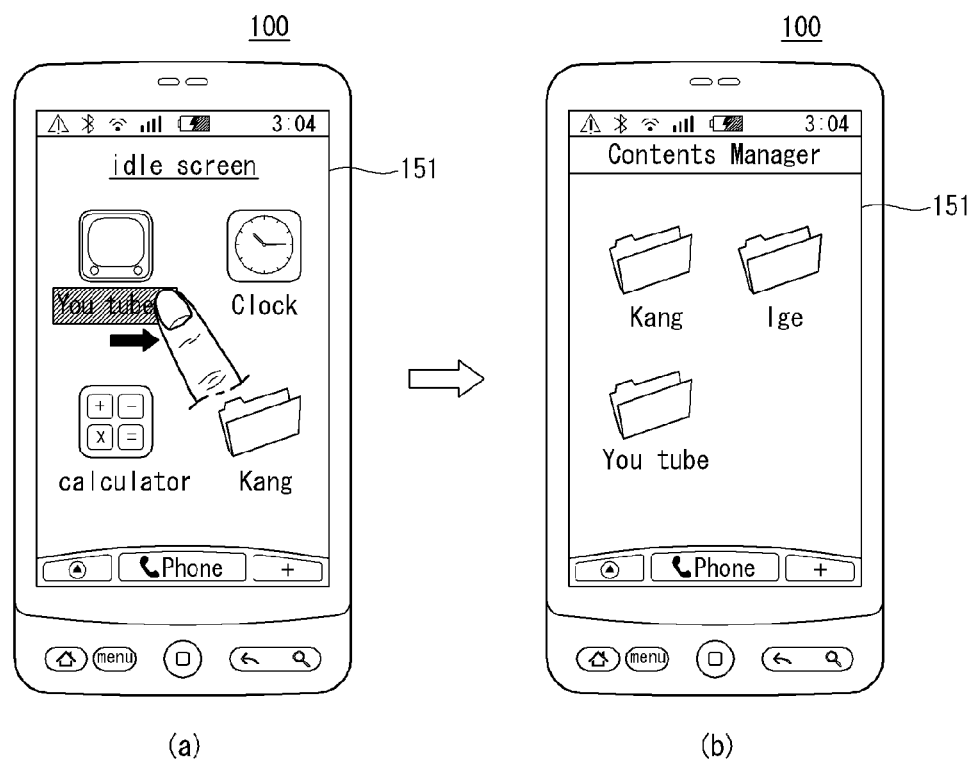
FIG. 8 illustrates a process of generating a folder having as its name text selected from an idle screen.

FIG. 8 illustrates a process of generating a folder having as its name text selected from the idle screen. Referring to FIG. 8, when the name of an application corresponding to an icon displayed on the idle screen, for example, "You tube" is selected from the idle screen by a user's touch operation, the controller 180 generates a subfolder "You tube" of the contents manager. In general, it is impossible to select the name of an application corresponding to an icon, but possible when the contents manager is activated.

Figure 9:
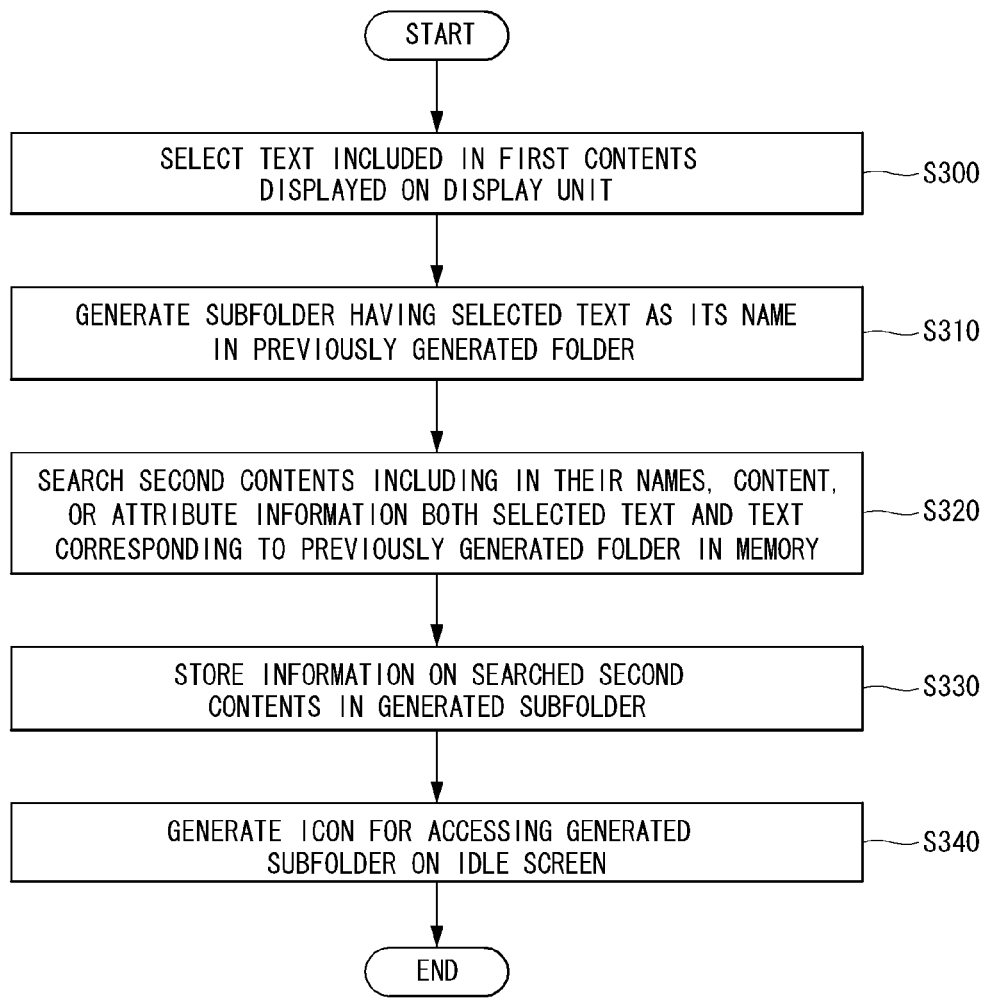
FIG. 9 is a flowchart illustrating a method of driving an electronic device according to an embodiment of the present invention.
Figure 10:
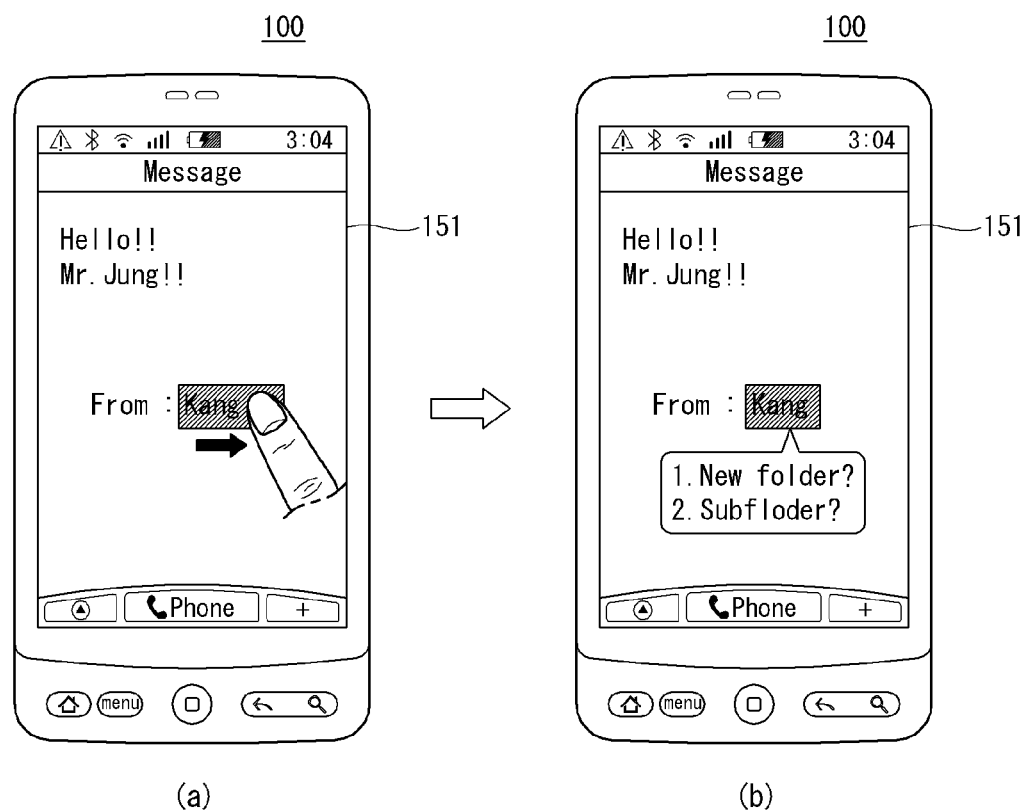
FIGS. 10 and 11 illustrate different images are displayed on a display unit according to the steps in the driving method of an electronic device illustrated in FIG. 9.
Figure 11:
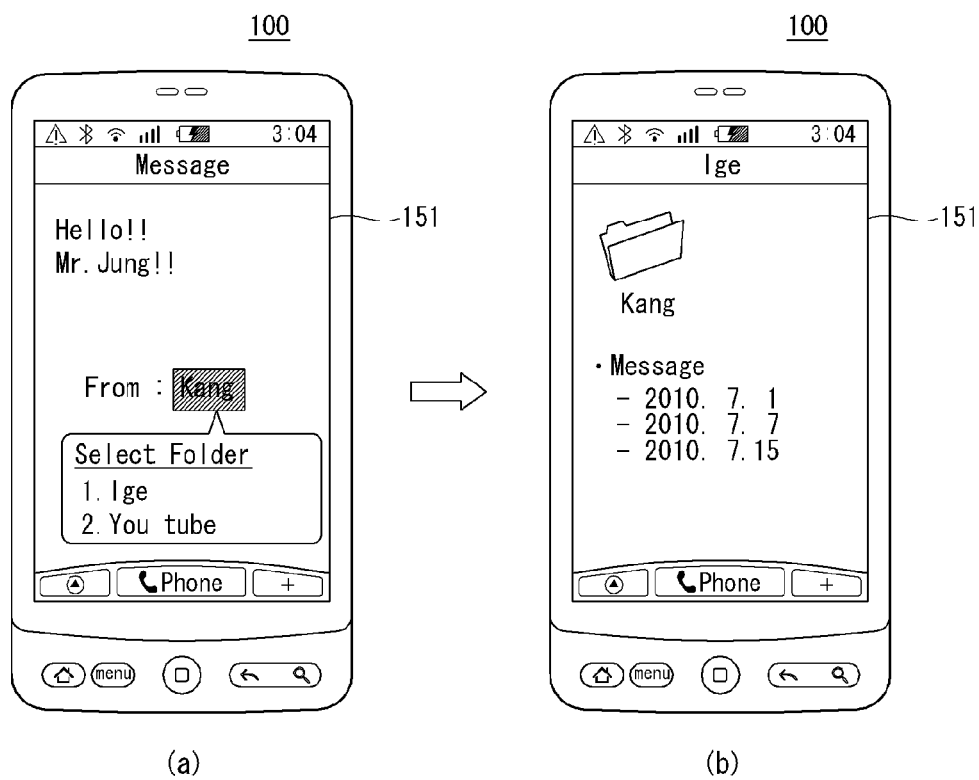

FIG. 9 is a flowchart illustrating a method of driving an electronic device according to an embodiment of the present invention. FIGS. 10 and 11 illustrate different images are displayed on the display unit according to the steps in the driving method of an electronic device illustrated in FIG. 9. The driving method of the electronic device will now be described with reference to FIGS. 2, 9 to 11.

When text is selected from first contents displayed on the display unit 151 (S300), the controller 180 generates a subfolder of the previously generated folder having the text as its name (S310). Referring to FIG. 10, when text "Kang" is selected by a user's touch operation, the controller 180 inquires whether to generate a new folder having the text "Kang" as its name or a subfolder of the previously generated folder.

When a user selects to generate a subfolder of the previously generated folder, the controller 180 provides the user with a list of previously generated folders so that the user may select one of the folders. Referring to FIG. 11, the controller 180 provides a list of previously generated folders "lge" and "You tube", and when the user selects the folder "lge", a subfolder "Kang" is generated in the folder "lge".

When the subfolder corresponding to the selected text is generated in the previously generated folder, the controller 180 searches second contents associated with both the selected text and text corresponding to the previously generated folder in the memory 160. For example, as shown in FIG. 9, the controller 180 may search second contents including in their names, content, or attribute information both the selected text and text corresponding to the previously generated folder in the memory 160 (S320).

Referring to FIG. 11, the controller 180 may search second contents including in their names, content, or attribute information the selected text "Kang" and text "lge" corresponding to the previously generated folder "lge" in the memory 160.

When content search is complete, the controller 180 stores the information on the searched second contents in the generated subfolder (S330) and generates an icon for accessing the generated subfolder on the idle screen (S340). Referring to FIG. 11, web pages whose content includes both "lge" and "Kang" may be stored in the subfolder "Kang" of the folder "lge".

unlike the method illustrated in FIG. 9, even if a subfolder having the selected text as its name to be stored in the previously generated folder, the controller 180 may also search second contents associated with only the selected text and may store information on the searched second contents in the generated subfolder.

Figure 12:
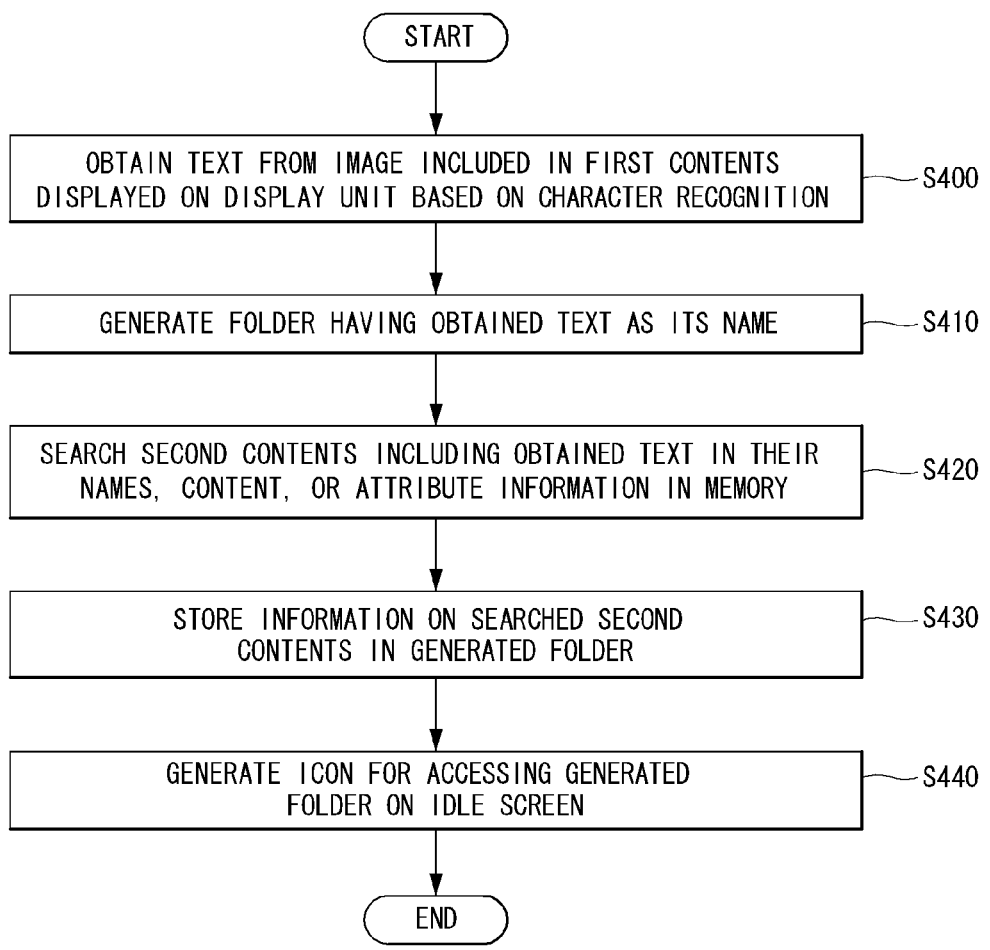
FIG. 12 is a flowchart illustrating a method of driving an electronic device according to an embodiment of the present invention.
Figure 13:
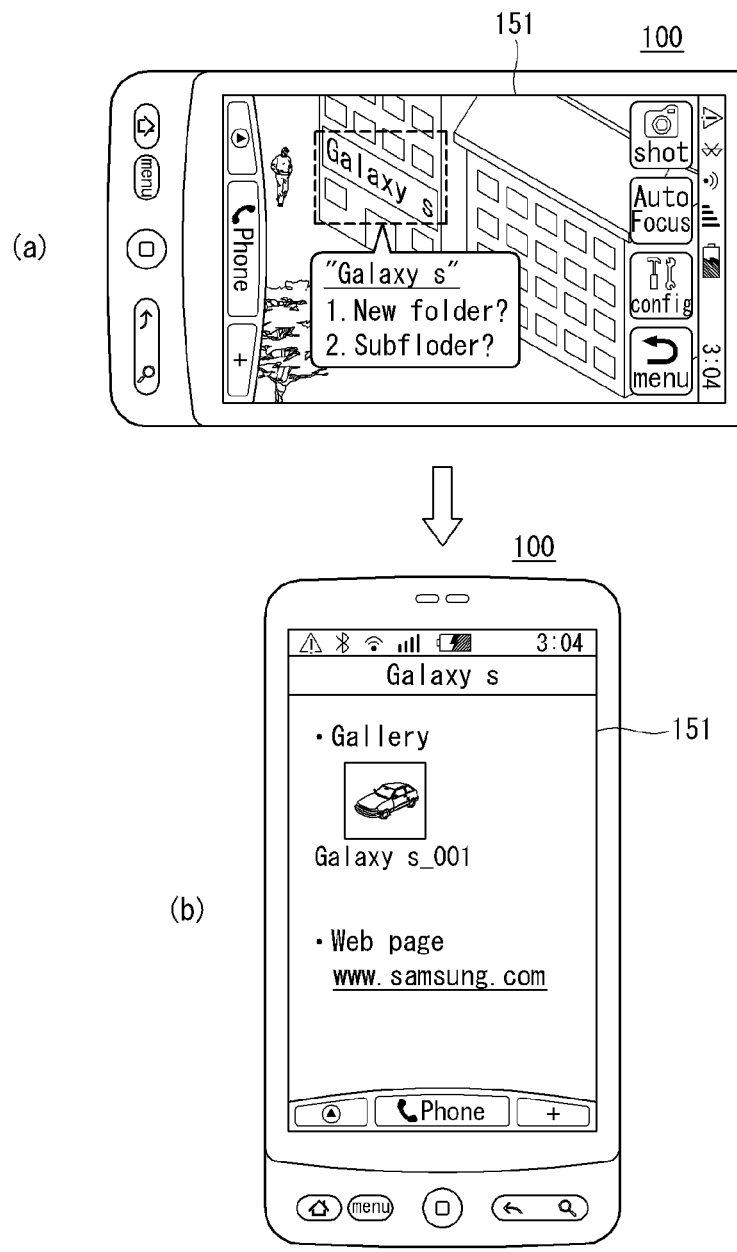
FIG. 13 illustrates that different images are displayed on a display unit according to the steps in the method of driving an electronic device as illustrated in FIG. 12.

FIG. 12 is a flowchart illustrating a method of driving an electronic device according to an embodiment of the present invention. FIG. 13 illustrates that different images are displayed on the display unit 151 according to the steps in the method of driving an electronic device as illustrated in FIG. 12. The method of driving an electronic device will now be described with reference to FIGS. 2, 12, and 13.

When first contents are displayed on the display unit 151, the controller 180 obtains text from an image included in the first contents (S400) and generates a folder having the obtained text as its name (S410). The controller 180 may obtain the text from the image based on a character recognition function of the contents manager. According to an embodiment, the controller 180 may also obtain the text from the image using a separate character recognition application.

Referring to (a) of FIG. 13, the controller 180 recognizes text "Galaxy s" from an image displayed on the display unit 151 and displays a message on the display unit 151 to inquire whether to generate a new folder having the "Galaxy S" as its name or to generate a subfolder having the "Galaxy S" as its name in a previously generated folder.

Referring to (b) of FIG. 13, when a user selects to generate a new folder having the "Galaxy S" as its name in (a) of FIG. 11, the controller 180 generates a new folder "Galaxy S".

After the generation of the folder having the text as its name, the controller 180 searches second contents including the text in their names, content, or attribute information in the memory 160 (S420), stores information on the searched second contents in the generated folder (S430), and generates an icon for accessing the generated folder on the idle screen (S440). Referring to (b) of FIG. 13, images and web pages including "Galaxy s" in their file names are stored in the folder having the "Galaxy s" as its name.

Figure 14:
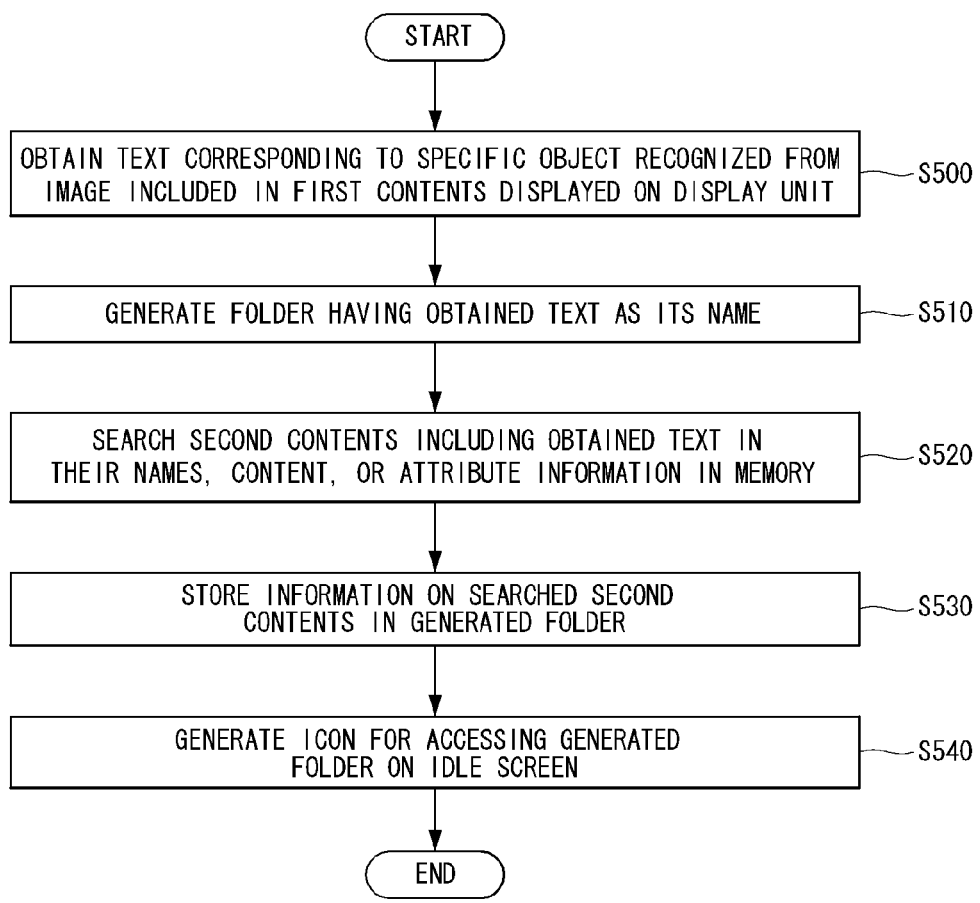
FIG. 14 is a flowchart illustrating a method of driving an electronic device according to an embodiment of the present invention.
Figure 15:
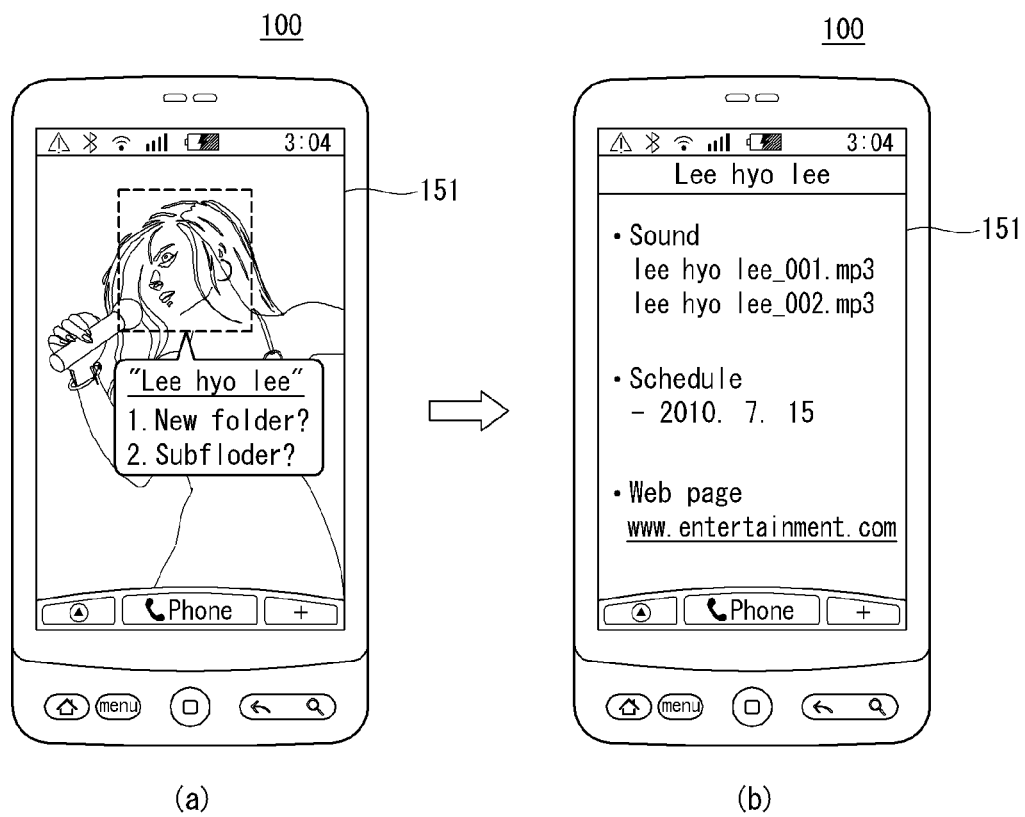
FIG. 15 illustrates contents included in a folder generated as an execution result of the driving method of an electronic device shown in FIG. 14.

FIG. 14 is a flowchart illustrating a method of driving an electronic device according to an embodiment of the present invention. FIG. 15 illustrates different images are displayed on the display unit according to the steps in the driving method of an electronic device illustrated in FIG. 14. The method of driving an electronic device will now be described with reference to FIGS. 2, 14, and 15.

When first contents are displayed on the display unit 151, the controller 180 recognizes a specific object from an image included in the first contents and obtains text corresponding to the recognized specific object (S500). For example, the controller 180 may recognize the face of a specific person included in the first contents, search an image matching the face of the specific person among images stored in a phone book, and obtain a name corresponding to the searched image as text corresponding to the recognized face of the specific person.

Referring to (a) of FIG. 15, the controller 180 may recognize the face of a specific person, for example, a singer, from an image displayed on the display unit 151 and obtain text "Lee hyo lee" corresponding to the singer's face. An image matching the singer's face may have been already stored in the phone book and the name corresponding to the image matching the singer's face may be "Lee hyo lee".

When the text is obtained from the first contents, the controller 180 generates a folder having the text as its name (S510). Referring to (a) of FIG. 15, the controller 180 displays a message on the display unit 151 to inquire whether to generate a new folder having "Lee hyo lee" as its name or to generate a subfolder having "Lee hyo lee" as its name in a previously generated folder. When a user selects to generate a new folder having "Lee hyo lee" as its name in (a) of FIG. 15, the controller 180 generates a new folder "Lee hyo lee" (refer to (b) of FIG. 15).

When the folder having the text as its name is generated, the controller 180 searches second contents including the text in their names, content, or attribute information in the memory 160 (S520), stores information on the searched second contents in the generated folder (S530), and generates an icon for accessing the generated folder on the idle screen (S540).

Referring to (b) of FIG. 15, music files including "Lee hyo lee" in their file names, schedules including "Lee hyo lee" in their content, and web pages including "Lee hyo lee" in their content are stored in the folder having as its name the text "Lee hyo lee" obtained from the displayed image.

Figure 16:
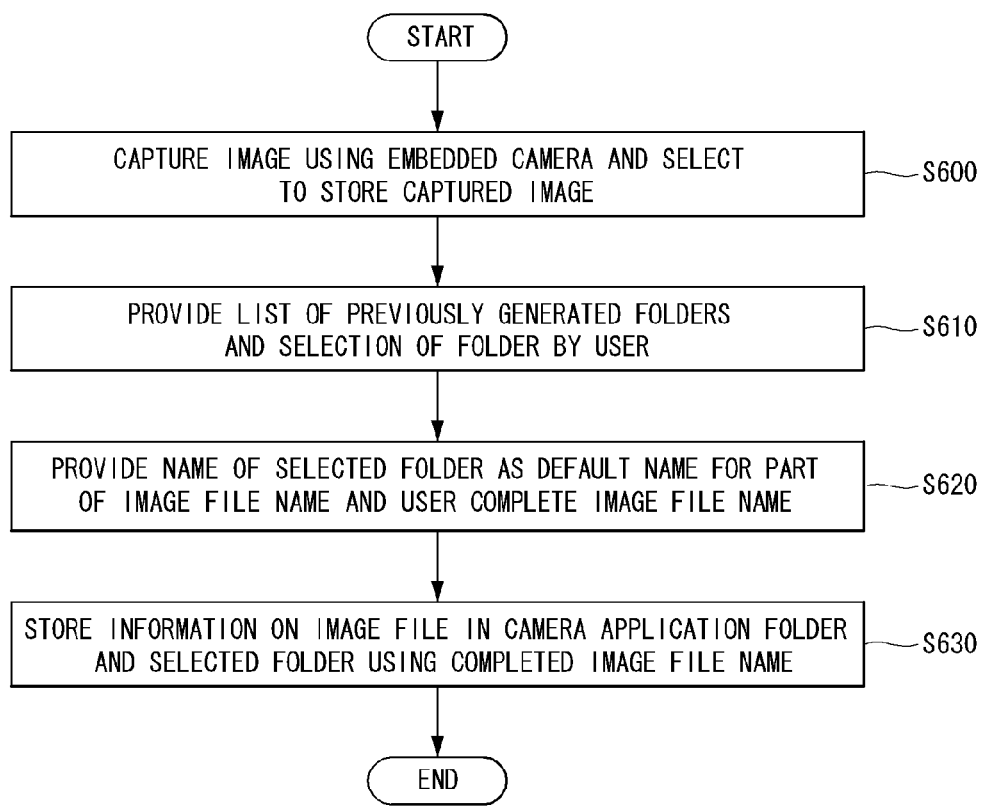
FIG. 16 is a flowchart illustrating a method of driving an electronic device according to an embodiment of the present invention.
Figure 17:
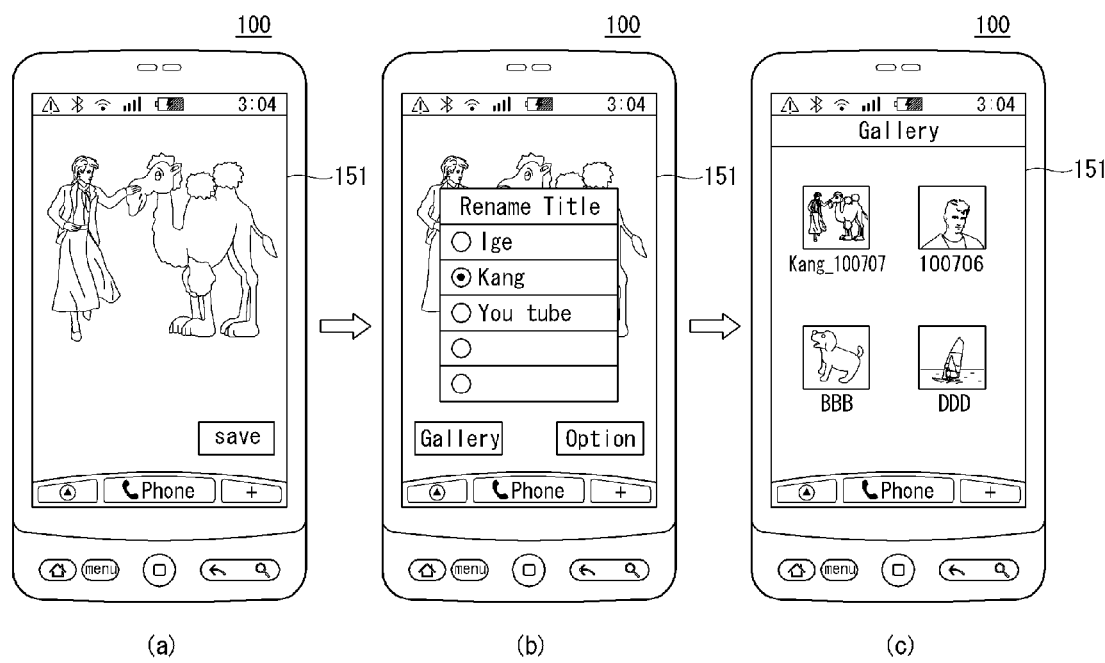
FIG. 17 illustrates different images are displayed on a display unit according to the steps in the driving method of an electronic device illustrated in FIG. 16.

FIG. 16 is a flowchart illustrating a method of driving an electronic device according to an embodiment of the present invention. FIG. 17 illustrates different images are displayed on the display unit 151 according to the steps in the driving method of the electronic device illustrated in FIG. 16. The driving method of the electronic device will now be described with reference to FIGS. 2, 16, and 17.

When a user captures an image by using a camera embedded in the mobile terminal 100 and selects to store the image (S600) while the contents manager is executed, the controller 180 provides the user with a list of previously generated folders by the contents manager (S610). Then, the user may select any one of the folders in the list.

Referring to FIG. 17, when the user touches a "SAVE" button in (a) of FIG. 17, the controller 180 displays a folder list including folders "lge", "Kang", and "You tube" on the display unit 151 in (b) of FIG. 17.

When any one of the folders in the list is selected by the user, the controller 180 provides the folder name as a default name for part of the image file to be stored, and the user may complete the name of the image file by using the default name (S620).

Referring to (c) of FIG. 17, when the user selects the "Kang" folder in the folder list in (b) of FIG. 17, the controller 180 provides a default name "Kang" for the name of the image file, and the user adds "100707" to the default name "Kang" to complete an image file name.

When the user completes the image file name and selects to store the image file, the controller 180 stores the image file in a camera application folder and the folder selected by the user with the complete image file name (S630). Referring to (c) of FIG. 17, the image file is stored in the camera application folder "Gallery". Although not shown in FIG. 17, the image file may also be stored in the folder "Kang" selected by the user in the folder list.

It has been described with reference to FIGS. 16 and 17 that while storing contents generated by an inner operation of the mobile terminal 100, such as an image file generated as an execution result of the camera application, the name of a folder generated by the contents manager is provided as a default name of the contents. However, the present invention is not limited thereto. For example, the present invention may also apply to a process of storing contents received from an external device.

Figure 18:
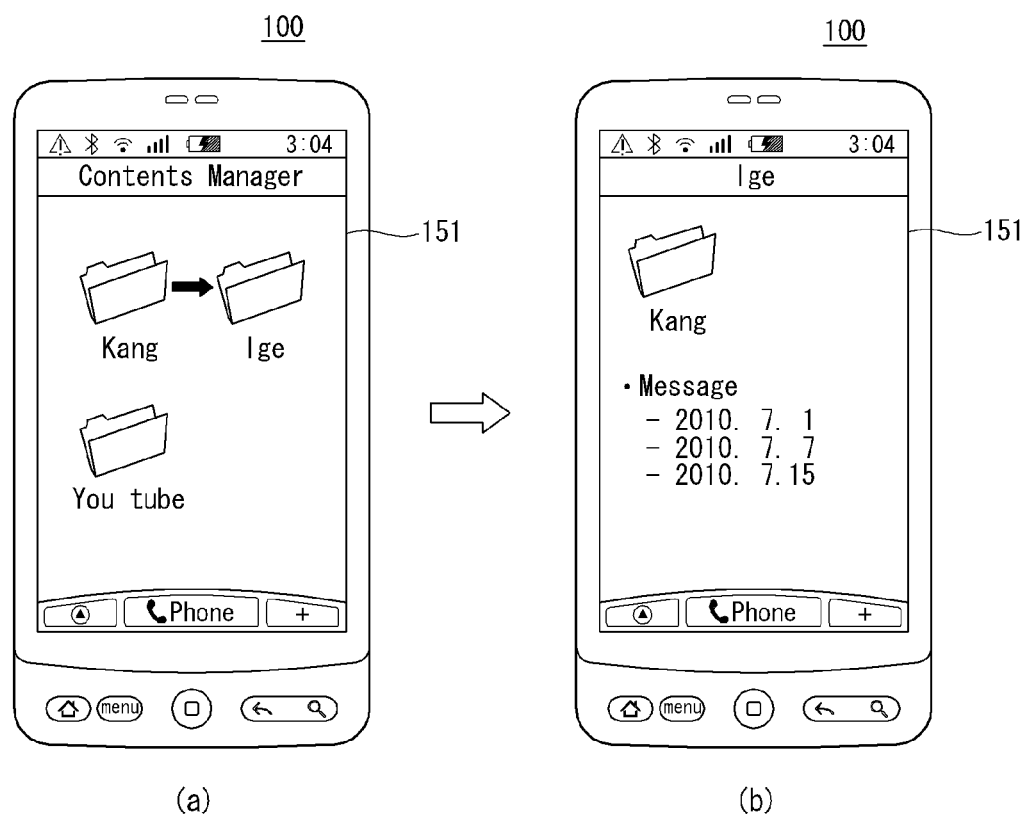
FIG. 18 illustrates a process of combining different folders with one another in an electronic device according to an embodiment of the present invention.

FIG. 18 illustrates a process of combining different folders with one another in an electronic device according to an embodiment of the present invention. Referring to (a) of FIG. 18, a user drags and selects the "Kang" folder and drops the "Kang" folder on the "lge" folder to combine a subfolder "Kang" of the contents manager with a subfolder "lge" of the contents manager. It can be seen in (b) of FIG. 18 that the "Kang" folder is included in the "lge" folder.

Figure 19:
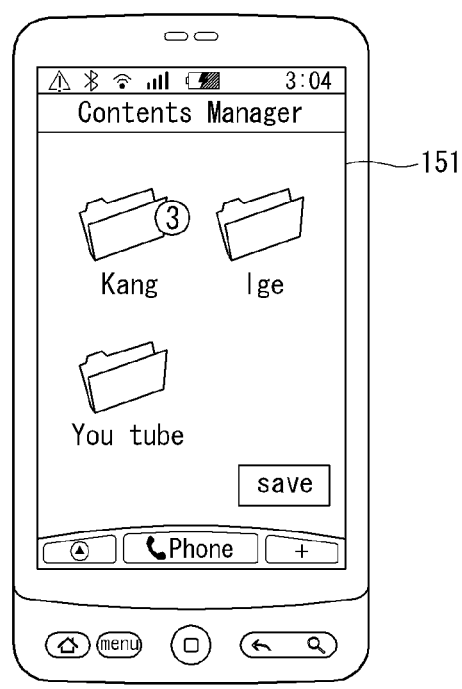
FIG. 19 is a view illustrating that new contents are stored in a folder generated by a content managing operation of an electronic device according to an embodiment of the present invention.

FIG. 19 is a view illustrating that new contents are stored in a folder generated by a content managing operation of an electronic device according to an embodiment of the present invention. In FIG. 19, the numeral "3" attached on the "Kang" folder denotes that three new contents are stored in the folder. According to an embodiment, when the contents manager is set to automatically search and store contents associated with "Kang", a user may easily identify the folder updated with the searched contents.

Figure 20:
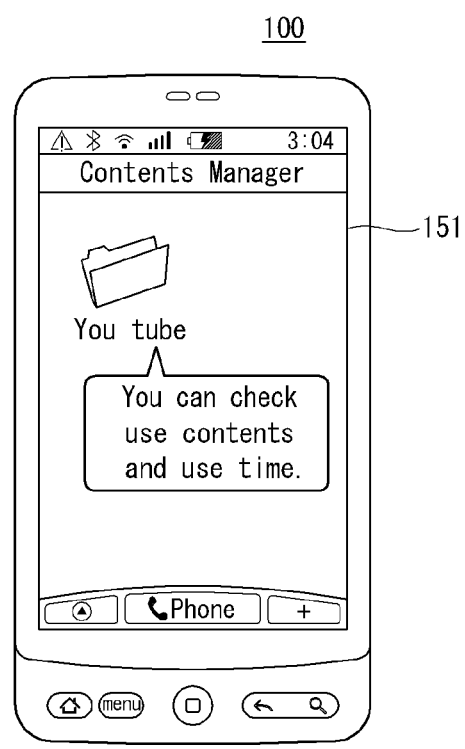
FIG. 20 illustrates that when the name of a folder generated by a content managing operation of an electronic device according to an embodiment of the present invention originates from a name of an application, a use history of the application may be stored in the folder.

FIG. 20 illustrates that when the name of a folder generated by a content managing operation of an electronic device according to an embodiment of the present invention originates from the name of an application, a use history of the application may be stored in the folder. Referring to FIG. 20, when a subfolder "You tube" of the contents manager is generated based on the name of an application, the controller 180 stores contents used by the application "You tube" corresponding to the folder and a use history of the "You tube" application, such as a use time, in the folder.

Figure 21:
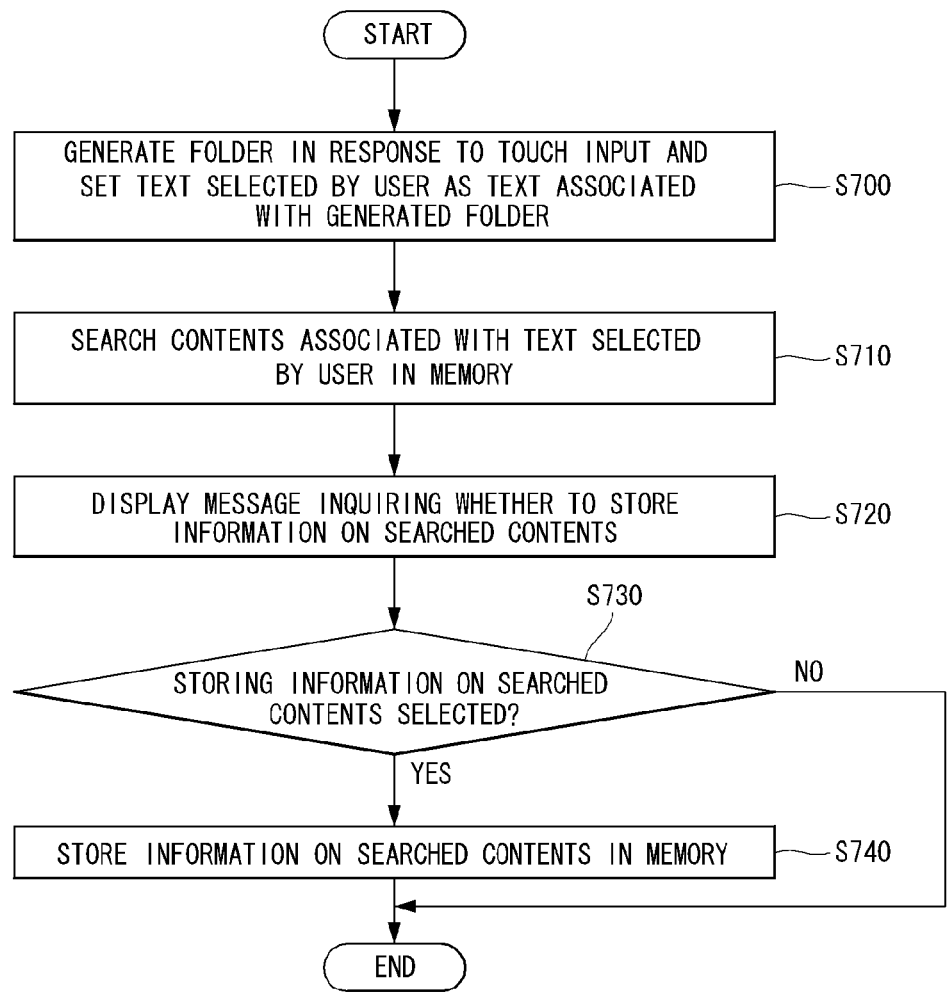
FIG. 21 is a flowchart illustrating a method of driving an electronic device according to an embodiment of the present invention.
Figure 22:
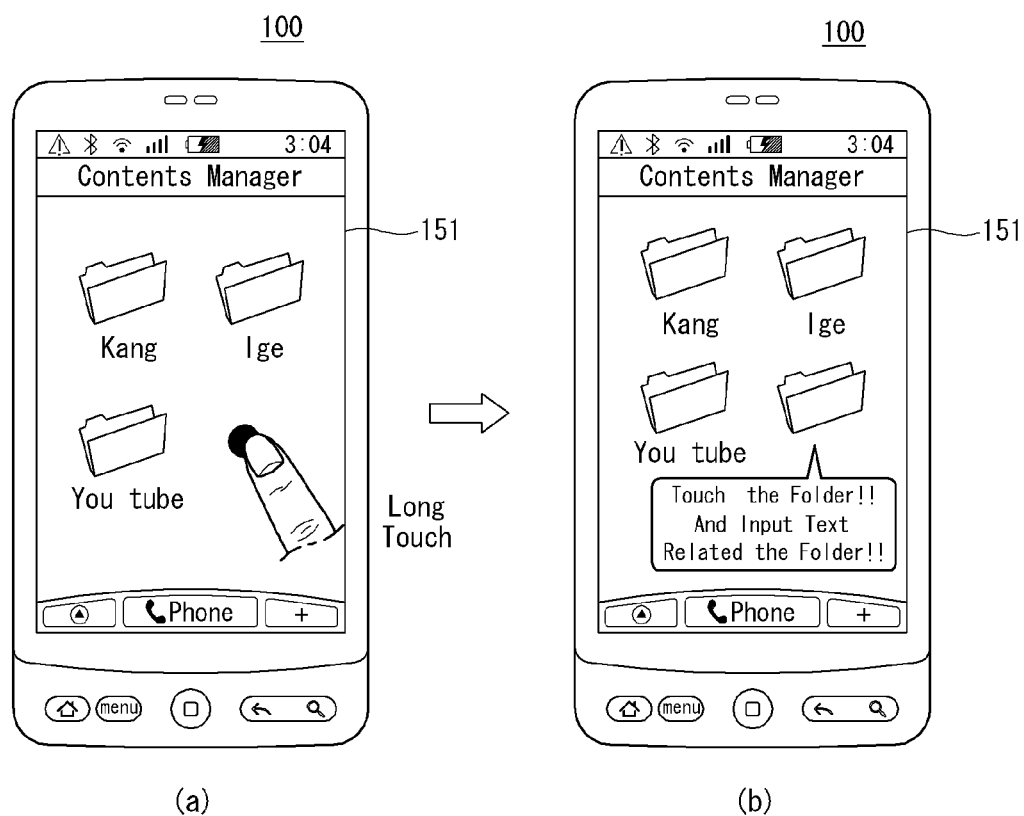
FIG. 22 is a view illustrating a step of generating a folder based on the electronic device driving method illustrated in FIG. 21.

FIG. 21 is a flowchart illustrating a method of driving an electronic device according to an embodiment of the present invention. FIG. 22 is a view illustrating a step of generating a folder based on the electronic device driving method illustrated in FIG. 21. The driving method of the electronic device will now be described with reference to FIGS. 2, 21, and 22.

When a user touches an empty space on the display unit 151 (for example, a "long touch"), the controller 180 receives a touch input based on the touch operation. Then, the controller 180 generates a folder in response to the touch operation and displays the generated folder on the display unit 151, and sets text selected by the user as a tesxt associated with the folder (S700). The text may be set as the name of the folder.

Referring to FIG. 22, when the user performs a long touch on an empty space on the display unit 151 in (a) of FIG. 22, the controller 180 generates a folder and displays a message requesting the user to input a text associated with the generated folder that is used for searching related contents in (b) of FIG. 22. Then, the user may touch the folder to set the word associated with the folder.

Unlike that shown in FIG. 22, the controller 180 may also obtain a text associated with the folder from first contents displayed on the display unit 151. For example, the controller 180 may obtain as the text associated with the folder text selected from the first contents by a user's touch-and-drag operation, text extracted from an image included in the first contents by character recognition, or text corresponding to an object recognized from an image included in the first contents.

When the text associated with the folder is set, the controller 180 searches second contents associated with the selected text in the memory 160 (S710). The second contents associated with the selected text may be contents including the selected text associated with the folder in at least one of their names, content, or attribute information. If the folder is a subfolder of a previously generated folder, the controller 180 may search second contents associated with both the text associated with the previously generated folder and the text associated with the subfolder in the memory 160.

When the second contents associated with the folder are searched in the memory 160, the controller 180 displays a message inquiring whether to store information on the searched second contents in the memory 160 on the display unit 151 (S720).

When the user selects to store the information on the searched second contents in response to the inquiry message (S730), the controller 180 stores the information on the searched second contents in the memory 160 (S740). The information on the searched second contents may include at least one of images corresponding to the searched second contents, names, abstract information, formats, storing locations, and sizes of the searched second contents, and dates associated with the searched second contents.

The method described herein of operating the electronic device may be written as computer programs and may be implemented in digital microprocessors that execute the programs using a computer readable recording medium.

The method of controlling the mobile terminal may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that can store data that can be thereafter read by a computer system. Examples of the computer readable recording medium may include read-only memory (ROM), random-access memory (RAM), CD-ROMs, DVD-ROM, DVD-RAM, magnetic tapes, floppy disks, optical data storage devices. The computer readable recording medium may also be distributed over network coupled computer systems so that the computer readable code is stored and executed in a distribution fashion.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other embodiments.

Although embodiments have been described with reference to a number of illustrative embodiments, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. An electronic device comprising:
a memory configured to store information;
a display unit configured to display first content such that a plurality of words are displayed on the display unit; and
a controller configured to:
   receive a signal for selecting a word from among the plurality of words displayed on the display unit,
   generate a first folder having a name comprising the selected word,
   search for content to store in the first folder, the search including a search of the memory based on the selected word, wherein a result of the search identifies second content that comprises the selected word in at least a name, content, or attribute information of the second content, and
   store the identified second content in the first folder.

2. The electronic device of claim 1, wherein the selected word comprises at least text extracted by character recognition from an image in the displayed first content, or text corresponding to an object recognized from the image in the displayed first content.

3. The electronic device of claim 1, wherein the first folder is a subfolder of a previously generated folder.

4. The electronic device of claim 3, wherein the controller is further configured to search the memory for content based on text corresponding to the previously generated folder.

5. The electronic device of claim 1, wherein the identified second content comprises at least an image corresponding to the identified second content, a name of the identified second content, abstract information of the identified second content, a format of the identified second content, a location of the identified second content, a size of the identified second content, or a date associated with the identified second content.

6. The electronic device of claim 1, wherein the controller is further configured to:
   generate an icon for accessing the first folder; and
   control the display unit to display the generated icon on an idle screen.

7. The electronic device of claim 1, wherein the name of the identified second content comprises the selected word.

8. The electronic device of claim 1, wherein the controller is further configured to:
   provide the selected word as a part of the name of the identified second content.

9. An electronic device comprising:
a memory configured to store information;
a display unit configured to display information; and
a controller configured to:
   receive a word input by a user,
   generate a first folder on the display unit,
   set a name of the first folder based on the received word,
   search for content to store in the first folder, the search including a search of the memory based on the received word, wherein a result of the search identifies first content that comprises the received word in at least a name, content, or attribute information of the first content when the word is received and the first folder is generated, and
   store the first content in the first folder.

10. The electronic device of claim 9, wherein:
the display unit is further configured to receive a touch input; and
the first folder is generated and a user interface for receiving the word is displayed on the display unit when the touch input is received on an empty space displayed on the display unit.

11. The electronic device of claim 9, wherein the controller is further configured to:
   control the display unit to display second content; and
   receive the word based on the displayed second content.

12. The electronic device of claim 11, wherein:
the received word comprises at least a word in the displayed second content, a word extracted by character recognition from an image in the displayed second content, or a word corresponding to an object recognized from the image in the displayed second content.

13. The electronic device of claim 9, wherein:
the display unit is further configured to receive a touch input; and
the controller is further configured to:
   control the display unit to display second content when the touch input is received on an empty space displayed on the display unit, and
   receive the word based on the displayed second content.

14. The electronic device of claim 9, wherein the first folder is a subfolder of a previously generated folder.

15. The electronic device of claim 14, wherein the controller is further configured to search the memory for content based on text associated with the previously generated folder.

16. The electronic device of claim 9, wherein the first content comprises at least a date associated with the first content, an image corresponding to the first content, a name of the first content, abstract information of the first content, a format of the first content, a location of the first content, or a size of the first content.

* * * * *